UNITED STATES PATENT OFFICE.

JAMES B. WILLIAMS, OF SAN FRANCISCO, ASSIGNOR TO JAMES L. DE FREMERY, OF OAKLAND, CALIFORNIA.

COMPOSITION OF MATTER FOR INSULATING MATERIAL.

SPECIFICATION forming part of Reissued Letters Patent No. 10,846, dated June 21, 1887.

Original No. 335,495, dated February 2, 1886. Application for reissue filed May 27, 1887. Serial No. 239,583. (No specimens.)

*To all whom it may concern:*

Be it known that I, JAMES B. WILLIAMS, of San Francisco, in the county of San Francisco and State of California, have invented a new and useful composition of matter, being an improvement in insulating material for insulating conductors of electricity and for the better insulation of instruments now used as insulators, whether made of glass or other material, of which the following is a specification.

My composition consists of the following ingredients, combined in about the proportions stated: saturated solution of pure gutta-percha in chloroform, forty (40) parts, by measure; saturated solution of pure india-rubber in chloroform, thirty (30) parts, by measure; saturated solution of colophony in benzole, fourteen (14) parts, by measure; saturated solution of gum-dammar in benzole, ten (10) parts, by measure; saturated solution of asphalt in benzole, four (4) parts, by measure; anhydrous paraffine-oil, two (2) parts, by measure; powdered silica or its equivalent, a sufficient quantity, as hereinafter stated, except when a thin coating is desired, when the silica may be omitted altogether.

The proportions above given are relative only, and may be somewhat varied without impairing the efficiency of the compound as an insulating medium.

If it be desired to apply a heavy coating of the compound to fibrous material covering wires—as in the manufacture of insulated wires and electric cables—the silica is added in sufficient quantity to produce a thick viscid compound, which can be applied by any of the methods employed for saturating the coverings of wires with insulating material.

I am fully aware that the different ingredients of which my compound is composed have been used for the purposes of insulation, but never, to my knowledge, have they been combined as in my composition.

Carefully-made experiments with a quadrant electrometer and a Ruhmkorff coil have demonstrated the fact that a small area of the compound, when applied as hereinafter described, is sufficient to prevent the leakage of very high-tension currents across its surface.

The usual method of using wires for telegraphing and similar purposes is by fastening them to instruments of glass or other non-conducting material known as "insulators," which are fastened to poles of wood, stone, or iron. The object of this method of suspension is to prevent the wires from coming in contact with any body or substances that would permit the current to become "grounded."

It is a well-known fact that leakage of the electric current from wires so suspended does not take place into the air, except under very rare conditions; but it is also a well-known fact that leakage does take place through and across the insulators commonly used. When across or over the surface of the insulator, it is known as "surface-leakage," and this is the most difficult form of leakage to prevent.

Glass insulators of various shapes are probably the best for ordinary purposes; but glass is hygroscopic, and except during dry hot weather contains a film of moisture upon its surface. This film of moisture is a partial conductor of electricity, and readily allows a portion of the current to pass over the insulator to the poles, and thence to the earth or to neighboring wires supported on the same pole or cross-arm. Particularly is this the case during rainy weather, or when the poles or other supports are made of metal, or when the wooden poles have lightning-rods fastened to them.

Manufacturers of glass insulators give them such shapes that a considerable extent of surface intervenes between the wire fastened to them and the cross-arm, studs, or brackets to which the insulators are attached.

Several forms of insulators are used, composed of various insulating compounds; but with the exception of a few containing paraffine or other moisture-repelling substances, almost all will allow the deposition of a film of moisture, or some chemical product which is a partial conductor, upon the surface which is exposed to the weather. Even when wires are coated with many insulating compounds now in use, and then suspended from the poles or other supports, and passed through holes made in the frame-work of buildings for office-connections, a constant leakage takes place through the coverings of the wires. This fact can be demonstrated by special methods of testing.

The principal object of my invention is to provide an efficient insulation for wires carrying electric currents used for telegraphing, telephoning, electric lighting, transmission of power, &c.; but the compound may also be applied to various other purposes, as will be hereinafter stated.

For the insulation of wires suspended on insulators the compound is applied to the entire surface, or in one or more zones on the inner and outer surfaces of glass or other insulator used for the attachment of wires, by being painted upon them with a brush while they are *in situ* on the poles, studs, or brackets; or it may be applied to them before they are placed in position upon their various supports by the use of a brush, or by immersing them in the compound and afterward draining off the superfluous compound.

In addition to applying the compound to the insulators, it is also applied to the coverings of the wires insulated with a layer of cotton fiber saturated with insulating material, as they pass through apertures in the frame-work of buildings and through the wood-work or other material to which the various office electrical instruments are fastened, the object being to thoroughly insulate the wires in every portion of their length where they or their various coverings come in contact with any substance through or over the surface of which the current may be grounded.

The compound may also be used for coating the insulating-supports of "testing" and other kinds of electrical apparatus in the manufacturing of condensers, and for all other purposes to which insulating compounds are applied. When applied as herein stated, surface-leakage is almost entirely prevented, whether the condition of the atmosphere be humid or otherwise.

The compound is applied cold, and whether applied to the surfaces of the different substances to be insulated by the use of a brush or by the substances themselves being immersed in it and the superfluous compound drained off, the solvents of the different ingredients employed in its manufacture rapidly evaporate, leaving the compound as a hard flexible semi-transparent coating, which remains permanently attached to any substance to which it may be applied.

I do not claim the mode of affixing my invention to conductors of electricity, nor to cables, wires, or other materials or substances, as this may be done by well-known methods, the invention having no connection with the act of placing the compound upon the matter, material, or substance to be insulated.

I do not claim as any part of my invention any of the ingredients, taken separately, of which my invention is composed, as their insulating properties are well known.

Having described my invention, what I do claim, and desire to secure by Letters Patent of the United States, is—

An electric insulating compound composed of gutta-percha, india-rubber, colophony, gum-dammar, and asphalt, all in solution, and anhydrous paraffine-oil with or without powdered silica, in about the proportions stated.

New York city, May 10, 1887.

JAMES B. WILLIAMS.

Witnesses:

CHAS. G. T. WAHLE, Jr.,

HENRY E. EVERDING.